(12) United States Patent
Bernat et al.

(10) Patent No.: US 11,210,142 B2
(45) Date of Patent: Dec. 28, 2021

(54) TECHNOLOGIES FOR MULTI-TENANT AUTOMATIC LOCAL BREAKOUT SWITCHING AND DATA PLANE DYNAMIC LOAD BALANCING

(71) Applicant: Intel Corporation, Santa Clara, CA (US)

(72) Inventors: Francesc Guim Bernat, Barcelona (ES); Ned Smith, Beaverton, OR (US); Kshitij Doshi, Tempe, AZ (US); Raghu Kondapalli, San Jose, CA (US); Alexander Bachmutsky, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 158 days.

(21) Appl. No.: 16/234,971

(22) Filed: Dec. 28, 2018

(65) Prior Publication Data
US 2019/0138356 A1    May 9, 2019

(51) Int. Cl.
*G06F 9/50*     (2006.01)
*H04L 9/08*     (2006.01)
(Continued)

(52) U.S. Cl.
CPC ............ *G06F 9/505* (2013.01); *H04L 9/0894* (2013.01); *H04L 63/0464* (2013.01);
(Continued)

(58) Field of Classification Search
CPC ... H04L 9/0894; H04L 63/0464; H04L 63/20; H04L 47/125; G06F 9/505; G06F 2209/503; G06F 2209/509
See application file for complete search history.

(56) References Cited

U.S. PATENT DOCUMENTS

2013/0223449 A1*  8/2013  Koganti ................ H04L 49/10
                                              370/392
2014/0325215 A1* 10/2014  Wright .................... G06F 7/588
                                              713/165
(Continued)

OTHER PUBLICATIONS

Intel® SGX Enabled Key Manager Service with OpenStack Barbican Somnath Chakrabarti, Brandon Baker, Mona Vij (Year: 2017).*
(Continued)

*Primary Examiner* — Emerson C Puente
*Assistant Examiner* — Paul V Mills
(74) *Attorney, Agent, or Firm* — Hanley, Flight & Zimmerman, LLC (57) ABSTRACT

Technologies for providing a multi-tenant local breakout switching and dynamic load balancing include a network device to receive network traffic that includes a packet associated with a tenant. Upon a determination that the packet is encrypted, a secret key associated with the tenant is retrieved. The network device decrypts a payload from the packet using the secret key. The payload is indicative of one or more characteristics associated with network traffic. The network device evaluates the characteristics and determines whether the network traffic is associated with a workload requesting compute from a service hosted by a network platform. If so, the network device forwards the network traffic to the service.

20 Claims, 5 Drawing Sheets

(51) Int. Cl.
*H04L 29/06* (2006.01)
*H04L 12/803* (2013.01)

(52) U.S. Cl.
CPC ........ *H04L 63/20* (2013.01); *G06F 2209/503* (2013.01); *G06F 2209/509* (2013.01); *H04L 47/125* (2013.01)

(56) References Cited

U.S. PATENT DOCUMENTS

| | | | | |
|---|---|---|---|---|
| 2017/0013495 | A1* | 1/2017 | Chae | H04W 52/383 |
| 2017/0251368 | A1* | 8/2017 | Ross | H04W 12/03 |
| 2018/0183855 | A1* | 6/2018 | Sabella | G06F 9/505 |
| 2019/0020657 | A1* | 1/2019 | Egner | G06Q 20/3224 |
| 2019/0124013 | A1* | 4/2019 | Murugesan | H04L 45/38 |
| 2020/0127983 | A1* | 4/2020 | Asghar | H04L 63/0428 |
| 2021/0014733 | A1* | 1/2021 | Soliman | H04W 28/0942 |
| 2021/0136142 | A1* | 5/2021 | Dong | H04L 67/101 |
| 2021/0182118 | A1* | 6/2021 | Sahin | H04W 52/0225 |

OTHER PUBLICATIONS

Stratos: Virtual Middleboxes as First-Class Entities Aaron Gember, Robert Grandi, Ashok Anand (Year: 2012).*
A Semi-definite Relaxation Approach to Mobile Cloud Offloading with Computing Access Point Meng-Hsi Chen, Ben Liang, Min Dong (Year: 2015).*
MAPCloud: Mobile Applications on an Elastic and Scalable 2-Tier Cloud Architecture M. Reza Rahimi, Nalini Venkatasubramanian, Sharad Mehrotra, and Athanasios V. Vasilakos (Year: 2012).*
Security in a Distributed Key Management Approach Gunther Schiefer, Murat Citak, Matthias Gabel, Jeremias Mechler (Year: 2017).*
A Cooperative Scheduling Scheme of Local Cloud and Internet Cloud for Delay-Aware Mobile Cloud Computing Tianchu Zhao, Sheng Zhou, Xueying Guo, Yun Zhao, Zhisheng Niu (Year: 2015).*
Mobile Edge Computing: A Survey on Architecture and Computation Offloading Pavel Mach and Zdenek Becvar, (Year: 2017).*

* cited by examiner

TECHNOLOGIES FOR MULTI-TENANT
AUTOMATIC LOCAL BREAKOUT
SWITCHING AND DATA PLANE DYNAMIC
LOAD BALANCING

BACKGROUND

Network devices, such as network switches, may be configured with "smart" technology that allows the switch to make intelligent decisions on directing incoming network traffic to a particular destination. For example, a network switch may include logic for determining an appropriate server to handle a given traffic flow. Such technology can be useful in a number of use cases, such as in edge computing, in which the switch is to decide whether to send network traffic data to a remote cloud server or to process the data more locally (e.g., by offloading some of the underlying compute tasks to local resources) to reduce latency in processing underlying workloads.

Further, in a given network platform, a switch may process network traffic of multiple tenants. A tenant may correspond to one of various telecommunications service providers that subscribe to resources provided by the network platform. In such cases, tenants can be independent (e.g., a distinct tenant) or hierarchical (e.g., a service provider that hosts services on resources of another service provider). Another example is an enterprise in which each organizational department corresponds to a distinct tenant. The switch may forward network traffic associated with a given tenant to a particular destination, such as to a compute device that performs a workload on behalf of the tenant or tenant user. In many cases, network traffic for each tenant may be encrypted (or the contents otherwise inaccessible to the network switch).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may be provided (e.g., communicated to) one or more devices that, upon execution, including performance of one or more preliminary processing operations to prepare the instructions for execution on the device(s) (e.g., by combining the instructions with data present on the device(s), by translating the instructions to a different format, etc.), cause the one or more devices to perform the operations described herein. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
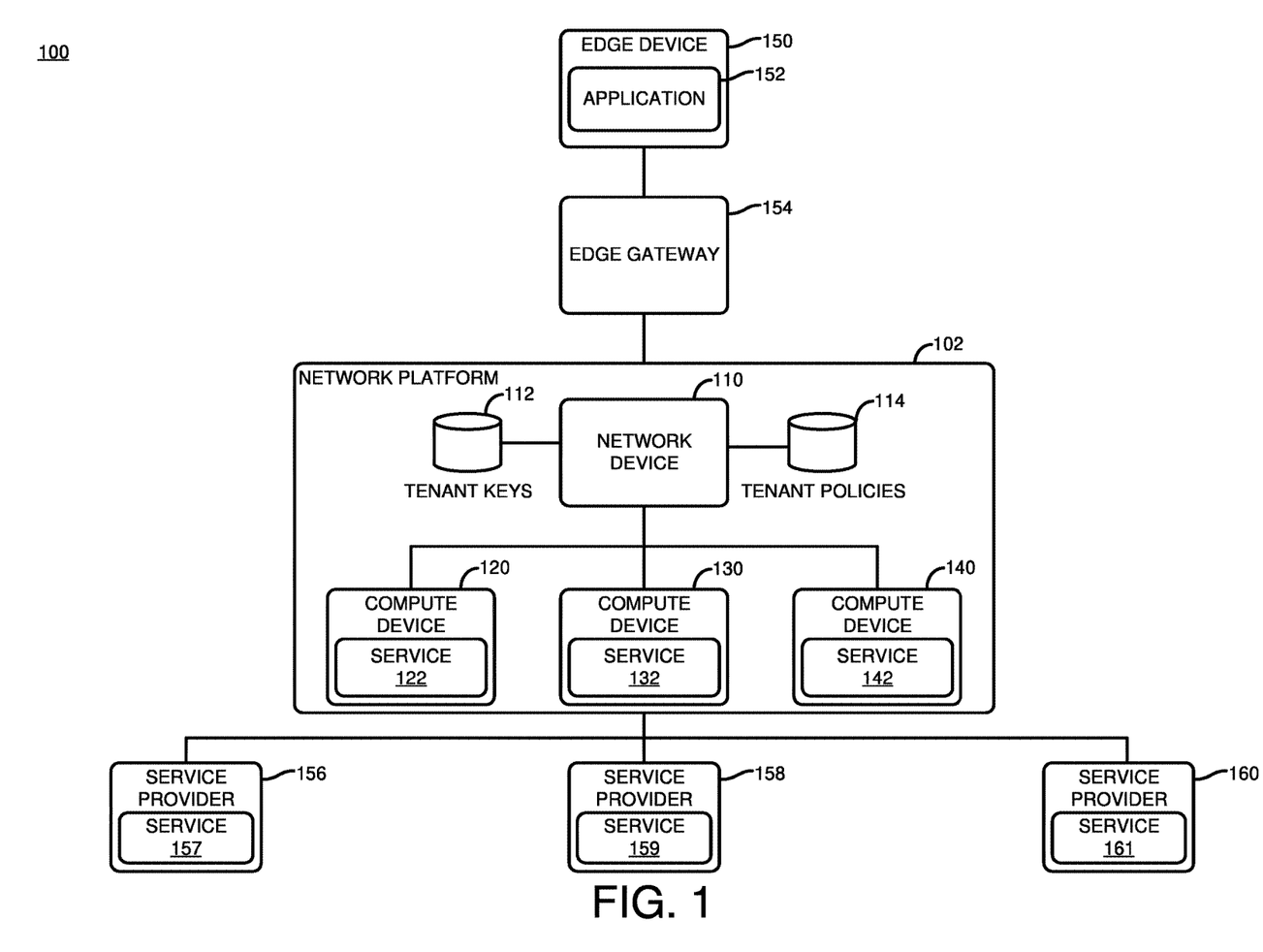
FIG. 1 is a simplified diagram of at least one embodiment of a system for providing local breakout switching and load balancing in a multi-tenant network environment.

Referring now to FIG. 1, a system 100 for providing local breakout switching and load balancing includes a network platform 102, an edge device 150, an edge gateway 154, and service providers 156, 158, and 160. The network platform 102 may be embodied as a central office (CO), base station, small cell, etc. Illustratively, the edge device 150 and network platform 102 are in communication via an edge gateway 154. The edge gateway 154 may be embodied as any device capable of communicating data between edge devices (e.g., edge device 150) and edge resources (e.g., compute devices and components thereof, owned and/or operated by one or more service providers, such as telecommunications service providers, such as service providers 156, 158, and 160) or other resources located in a cloud network.

Further, the edge gateway 154, in the illustrative embodiment, is configured to receive and respond to requests from the edge device 150 regarding characteristics of the edge resources, such as architectures of processors, accelerator devices, and/or other components thereon, latencies, power usage, and costs (e.g., monetary costs) associated with utilizing those edge resources. The edge gateway 154 and the edge resources, are positioned at one or more locations (e.g., in small cell(s), base station(s), etc.) along the edge (e.g., in an edge network) of a cloud.

The system 100 may form part of an edge network. The edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network, which may be embodied as a system-level horizontal architecture that distributes resources and services of computing, storage, control and networking anywhere between a core data center (e.g., a data center that is further away from and in a higher level of a hierarchy of the system 100 than the service providers 156, 158, and 160, and that includes multiple compute devices capable of executing one or more services (e.g., processes on behalf of one or more clients)) and an endpoint device (e.g., the edge device 150). The edge device 150 may manage policies, encryption keys, and personalization objects in the network device 110 (and tenant keys 112 and tenant policies 114) that persist in the network platform 102 even when the edge device 150 is offline. Such data may be used to automate behavior on behalf of the application 152 when interacting with other service providers such as service provider 156 (which may occur when the edge device 150 the application 152 are offline).

Illustratively, the network platform 102 includes a network device 110. The network device 110 may be embodied as any device that maps network traffic to a given destination, such as the service providers 156, 158, and 160. For example, the network device 110 may be embodied as a network switch. Further, edge resources maintained by each service provider 156, 158, and 160 may be associated with one or more tenants. More specifically, the service providers 156, 158, and 160 may provide computing resources (e.g., compute, accelerator, memory, and storage resources), such as by a service 157, 159, and 161, respectively. In addition, the network platform 102 may itself provide resources to edge devices. In particular, the network platform 102 may include a number of servers, such as compute devices 120, 130, and 140, each executing a service 122, 132, and 142, respectively. The edge device 150 may transmit workload data (e.g., via an application 152) to the edge network. The network device 110 may receive the workload data as network traffic and forward the network traffic to an appropriate destination, such as one of the services 157, 159, or 161. For example, the network traffic may be associated with resources of a particular tenant. The network device 110 may send the network traffic to the service capable of processing the tenant traffic (e.g., according to a policy).

In some cases, prior to transmission of the network traffic to the network device 110, the edge device 150 may encrypt the network traffic. As further described herein, embodiments disclose techniques to allow the network device 110 to provide a traffic proxy that evaluates characteristics of the network traffic to determine how to forward or process the traffic. For instance, the network device 110 may manage tenant keys 112 (also referred to herein as "secret keys") associated with each tenant. The network device 110 may decrypt, using the secret key associated with the tenant, a packet in the network traffic, to identify characteristics of the network traffic (e.g., latency, power usage, cost of usage requirements). In particular, the network device 110 may decrypt a header of the packet or the entire packet (e.g., based on a predefined configuration). Doing so allows the network device 110 to determine an appropriate destination to send the network traffic to conform with tenant policies 112, which may be embodied as any data indicative of quality of service (QoS) policies, service level agreement policies, security policies, and the like that are associated with the tenant. For instance, the network device 110 may determine, from a payload of a decrypted packet, that the network traffic can be processed locally (e.g., by one of the services 122, 132, or 142) after evaluating latency requirements specified by a QoS policy. The network device 110 may then execute a local breakout function to forward the network traffic to the service within the network platform 102. In addition, as further described herein, the network device 110 may load balance network traffic packets to providers to service requests based on a corresponding tenant policy 112 and characteristics (e.g., throughput, availability, etc.) of the service providers and the network switch 110 itself.

Figure 2:
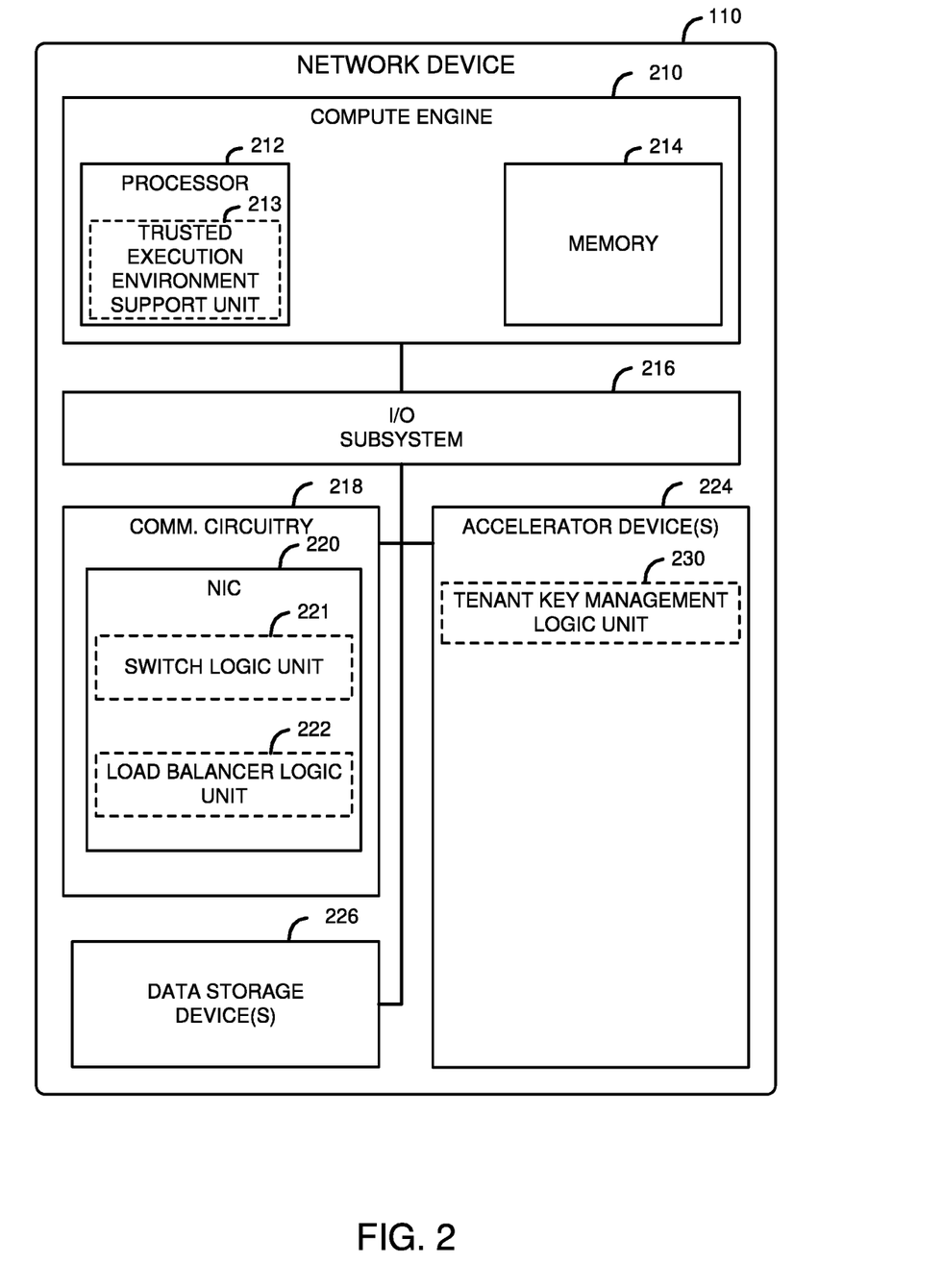
FIG. 2 is a simplified block diagram of at least one embodiment of the network device of FIG. 1.

Referring now to FIG. 2, the illustrative network device 110 includes a compute engine 210, an input/output (I/O) subsystem 216, communication circuitry 218, and one or more data storage devices 226. As described herein, the network device 110 may also include one or more accelerator devices 224. Of course, in other embodiments, the network device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device.

In the illustrative embodiment, the compute engine 210 includes or is embodied as a processor 212 and a memory 214. The processor 212 may be embodied as any type of processor capable of performing the functions described herein (e.g., maintaining the tenant keys 112). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein. Further, the processor 212 includes a trusted execution environment (TEE) support unit 213. The TEE support unit 213 may generate a secure enclave or any other variety of TEE used to provide access to secured data, such as the tenant keys 112.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications, data operated on by the application(s), libraries, and drivers.

The compute engine 210 is communicatively coupled to other components of the network device 110 via the I/O subsystem 216, which may be embodied as circuitry and/or components to facilitate input/output operations with the compute engine 210 (e.g., with the processor 212 and/or the main memory 214) and other components of the network device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the network device 110, into the compute engine 210.

The communication circuitry 218 may be embodied as any communication circuit, device, or collection thereof, capable of enabling communications over a network between the network device 110 and another compute device (e.g., the edge gateway 154, the compute devices 120, 130, 140, or the service providers 156, 158, 160, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the network device 110 to connect with another compute device (e.g., the edge gateway device 130, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the network device 110 at the board level, socket level, chip level, and/or other levels.

Illustratively, the NIC 220 includes a switch logic unit 221 and a load balancer logic unit 222. The switch logic unit 221 may be embodied as any device or circuitry (e.g., a processor, an ASIC, etc.) configured to connect devices (e.g., the edge device 150, edge gateway 154, compute devices 120, 130, and 140, service providers 156, 158, 160, etc.) to one another. To do so, the switch logic 221 is configured to provide packet switching to receive, process, and forward data. The switch logic unit 221 may also be configured to use to determine whether workload data received from devices can be processed on the network device 110 (e.g., as a function of tenant policies, current metrics associated with the network device 110, etc.). The load balancer logic unit 222 may be embodied as any device or circuitry (e.g., a processor, an ASIC, etc.) configured to provide functionality for forwarding data (e.g., network traffic, processed workload data, etc.) to one or more compute devices (e.g., compute devices 120, 130, and 140, service providers 156, 158, 160, etc.) according to one or more load balancing techniques. The load balancing logic unit 222 is also configured to evaluate one or more policies associated with a given tenant workload and current workload of the compute devices 120, 130, and 140, service providers 156, 158, 160 capable of serving the workload to select a load balancing technique to perform on the workload. The load balancing logic unit 222 may subdivide the workload based on the selected load balancing technique and transmit one or more tasks associated with the workload to each device determined to process the tasks.

The one or more illustrative data storage devices 226 may be embodied as any type of devices configured for short-term or long-term storage of data such as, for example, memory devices and circuits, memory cards, hard disk drives, solid-state drives, or other data storage devices. Each data storage device 226 may include a system partition that stores data and firmware code for the data storage device 226. Each data storage device 226 may also include one or more operating system partitions that store data files and executables for operating systems.

Each accelerator device(s) 224 may be embodied as any device(s) or circuitries configured to execute a set of operations faster than the processor 212 is capable of executing the operations. The accelerator device(s) 224 may include one or more field programmable gate arrays (FPGAs), each of which may be embodied as a set (e.g., a matrix) of logic gates that can be configured to perform a set of operations according to a defined configuration, e.g., a bit stream. Such bit streams may include functions for determining whether an underlying workload of tenant network traffic is targeted for a service local to the network platform 102 (e.g., one of the services 122, 132, or 142). The accelerator device(s) 224 may additionally or alternatively include a graphics processing unit (GPU), which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU), which may be embodied as any device or circuitry (e.g., a programmable logic chip, a processor, etc.) configured to perform operations related to machine vision, machine learning, and artificial intelligence. Illustratively, an accelerator device 224 may include a tenant key management logic unit 230. The tenant key management logic unit 230 may be embodied as any hardware or circuitry configured to securely maintain secret key data associated with tenants. The tenant key management logic unit 230 may manage a secret key for a given tenant which is used by a sending device (e.g., an edge device) to encrypt data. Further, each tenant key can be subject to specified constraints to prevent security attacks (e.g., the secret key may be generated on the fly using data known only between the sender and receiver, etc.). In addition, the tenant key management logic unit 230 may maintain a table of tenant identifiers and the secret key associated with the corresponding tenant. Further, the tenant key management logic unit 230 may maintain mappings of security associations with network traffic of each tenant. For instance, a security association may specify a network packet offset for a given tenant at which the network device 110 may extract (e.g., using the secret key associated with the tenant) payload data for forwarding, processing, and load balancing analysis.

The edge device 150, edge gateway 154, compute devices 120, 130, and 140, and the service providers 156, 158, 160, etc. may have components similar to those described in FIG. 2 with reference to the network device 110. The description of those components of the network device 110 is equally applicable to the description of components of these components, with the exception that, in some embodiments, the TEE support unit 213, switch logic unit 221, load balancer logic unit 222, and the tenant key management logic unit 230 are not included in devices other than the network device 110. However, these components (e.g., the TEE support unit 213, switch logic unit 221, load balancer logic unit 222, and the tenant key management logic unit 230 are not included in devices other than the network device 110) may be located in other devices located in the edge network, such as base stations, small cells, and other network switches. Further, it should be appreciated that any of the devices described herein (e.g., the network device 110, edge device 150, edge gateway 154, compute devices 120, 130, and 140, and the service providers 156, 158, 160, etc.) may include other components, sub-components, and devices commonly found in a computing device, which are not discussed above in reference to the network device 110 and not discussed herein for clarity of the description. Further, it should be understood that one or more components of a compute device may be distributed across any distance, and are not necessarily housed in the same physical unit.

As stated, the network device 110, edge device 150, edge gateway 154, compute devices 120, 130, and 140, and the service providers 156, 158, 160, etc. are in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
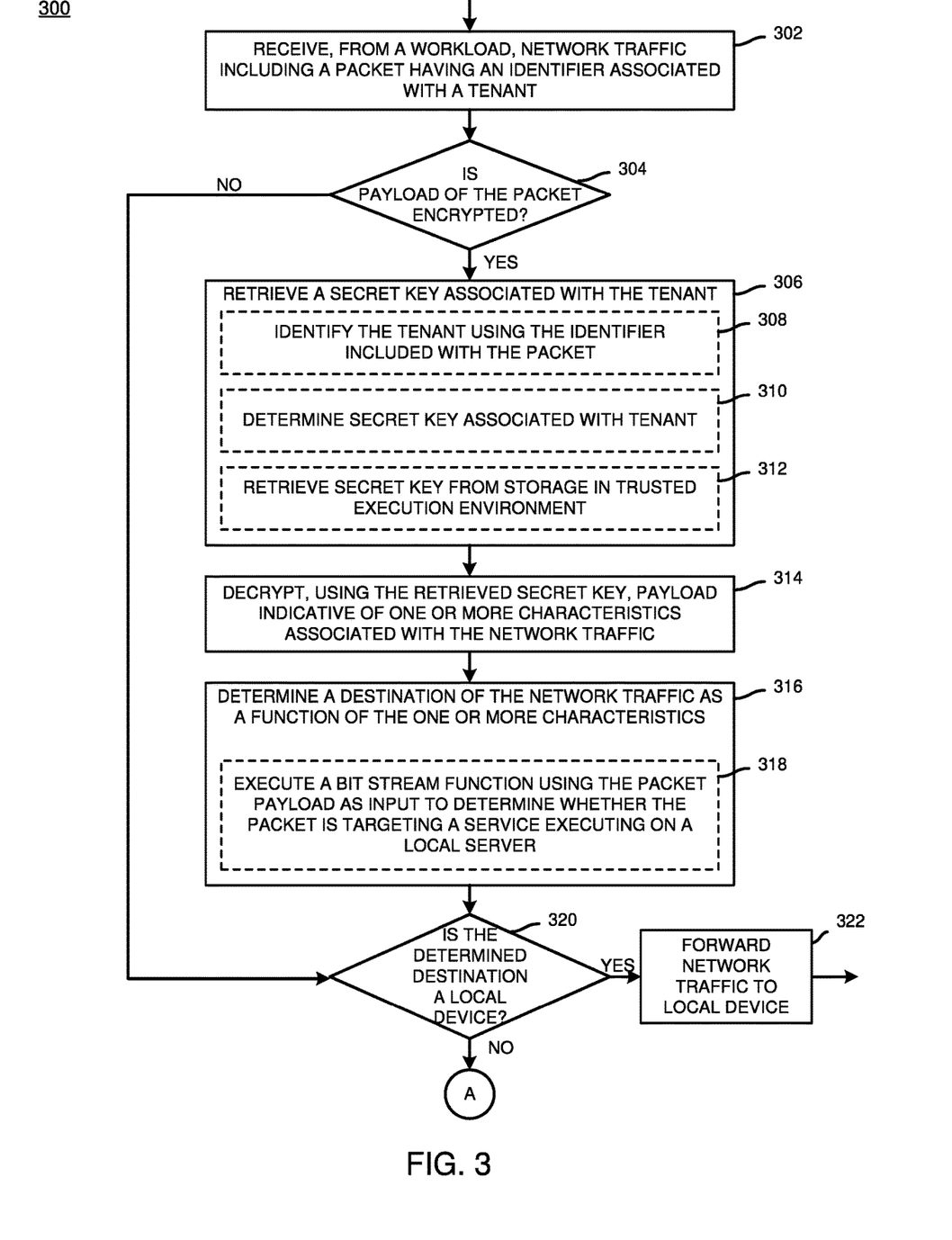
FIG. 3 is a simplified flow diagram of at least one embodiment of a method that may be performed by the network device of FIG. 1 for managing network traffic in a multi-tenant environment.

Referring now to FIG. 3, the network device 110, in operation, may execute a method 300 for managing tenant network traffic, e.g., for a given workload (e.g., executed by the application 152 of the edge device 150). As shown, the method 300 begins in block 302, in which the network device 110 receives network traffic having one or more packets. The packets may be associated with a given workload including one or more tasks. The workload may correspond to a variety of use cases, such as image object recognition (e.g., in autonomous vehicles), augmented reality/virtual reality algorithms (e.g., for wearable devices and other mobile devices), machine learning algorithms, and the like. In addition, the network traffic may be associated with a given tenant. As a result, the workload may be subject to policies regarding what resources of the edge network can be used given service level agreements, various QoS requirements (e.g., regarding latency, power usage), security requirements (e.g., security algorithms to be used). In some embodiments, the packets of the network traffic may be associated with an identifier (e.g., stored in a header of the packet). Also, in some cases, the network traffic includes an encrypted payload that is indicative of characteristics of the network traffic that the network device may use in evaluating how to process the network traffic. In such cases, the network traffic may be encrypted using the secret key associated with the underlying tenant. Further in some cases, the payload may be located in one of the packets (e.g., the first packet of a given packet sequence) or a number of packets (e.g., all packets or at intervals of the packets being transmitted).

In block 304, the network device 110 determines whether the network traffic is encrypted. For example, the network device 110 may evaluate a physical or virtual interface of the received network packet or the tenant identifier included as a cleartext value with the network packet to identify a policy with the tenant on whether the traffic associated with the tenant is encrypted. If not, the method 300 proceeds to block 320, which is described further herein. Otherwise, if the network device 110 determines that the network traffic is associated with the tenant is encrypted, then, in block 306, the network device 110 retrieves a secret key associated with the tenant. For instance, to do so, in block 308, the network device 110 identifies the tenant using the identifier provided with a packet in the network traffic. In block 310, the network device 110 determines a secret key associated with the tenant. The secret key may be maintained by a TEE in the network device 110 or any other secure environment maintained by the network device 110. In some embodiments, the network device 110 generates the secret key using information provided by the sending edge device 150 and information previously provided by the tenant to the network device 110. In block 312, the network device 110 obtains the secret key associated with the tenant, e.g., from the TEE of the network device 110.

In block 314, the network device 110 decrypts, using the secret key associated with the tenant, the encrypted payload of the packet. As stated, the payload may provide one or more characteristics associated with the network traffic, such as a service being targeted, workload requirements, and other characteristics. In block 316, the network device 110 determines, as a function of the one or more characteristics associated with the network traffic, a destination to which to forward the network traffic. For instance, to do so, in block 318, the network device 110 may execute an accelerated function to determine whether the network traffic is targeted to a particular service hosted by the network platform 102 (e.g., a location that is local relative to the network device 110). For example, the network device 110 may retrieve a bit stream corresponding to such a function to determine that the network traffic is targeting a compute service provided by the service provider 156, but the service 122 of the local compute device 120 also provides such a service. Forwarding the network traffic to the service 122, which is local relative to the network device 110, may reduce the latency to service the workload.

In block 320, the network device 110 determines whether to transmit the network traffic, e.g., as previously decrypted or unencrypted in cleartext, as originally encrypted, or as re-encrypted with a destination-specific secret key that is different from the secret key associated with the tenant, to a device local to the network device 110 (e.g., a device that is within the network platform 102) for processing. Further, in some cases, the network device 110 may perform address translation into the address of the local device. In the event that the network traffic is optionally re-encrypted, the determination may occur after a load balancing decision (discussed further herein relative to FIG. 4) is made. If the network device 110 determines to transmit the network traffic to a device local to the network device 110, then in block 322, the network device 110 transmits the network traffic to the local device. Otherwise, the network device 110 may transmit the network traffic to the destination specified in the network packets. In other cases, the network device 110 may further evaluate the one or more characteristics of the network traffic (e.g., for distributing the workload to a number of services under a load balancing technique) and proceed to method 400.

Figure 4:
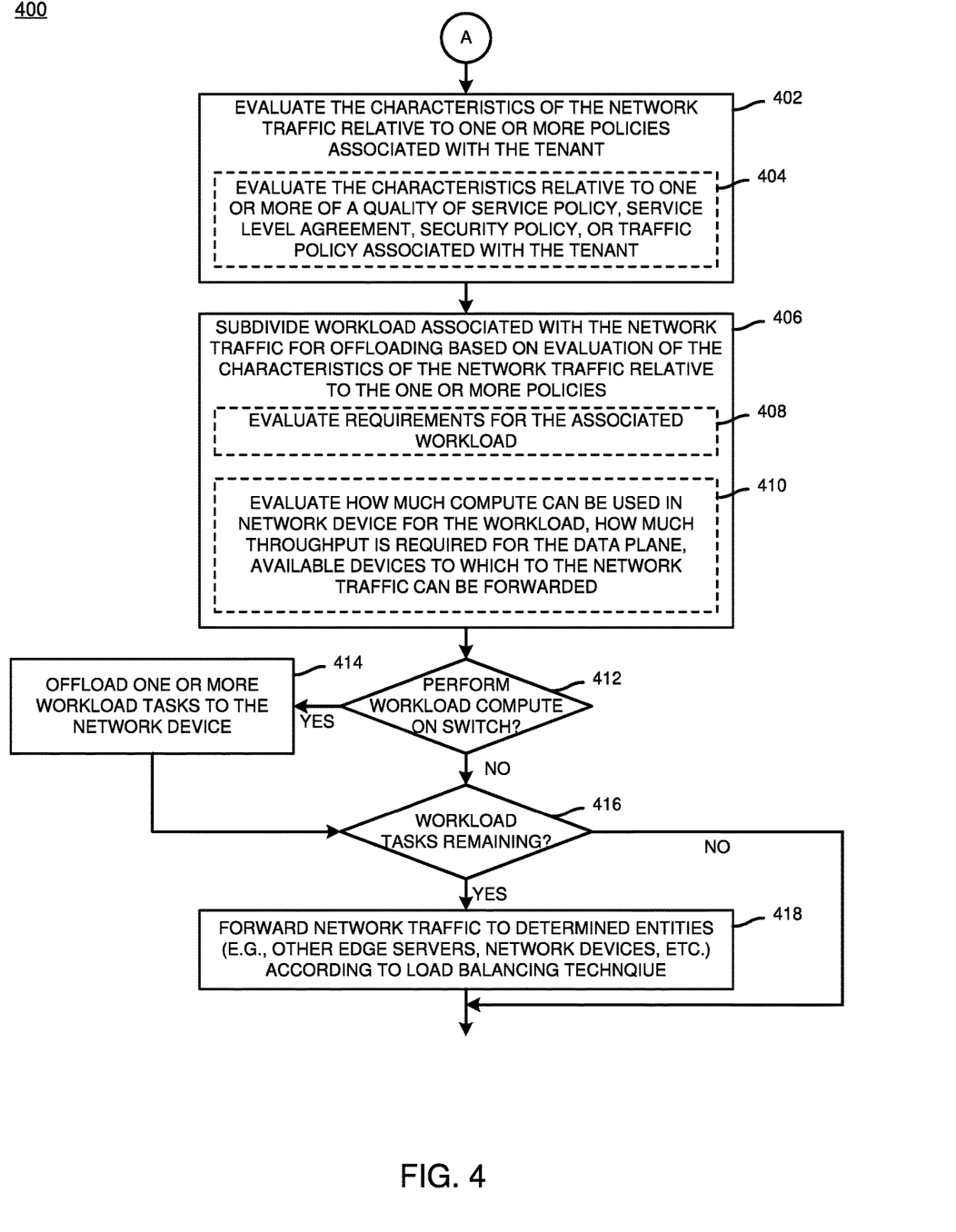
FIG. 4 is a simplified flow diagram of at least one embodiment of a method that may be performed by the network device of FIG. 1 for load balancing network traffic in a multi-tenant environment.

Referring now to FIG. 4, the network device 110, in operation, may perform a method 400 for load balancing network traffic associated with a given tenant. As shown, the method 400 begins in block 402, in which the network device 110 evaluates the characteristics of the network traffic obtained with regard to method 300. In particular, the network device 110 evaluates the characteristics relative to one or more policies associated with the tenant. More specifically, the network device 110 may retrieve policies associated with the tenant identifier (e.g., using the tenant identifier provided in at least one of the network packets). In block 404, the network device 110 evaluates the characteristics relative to policies including one or more of a QoS policy, SLA, security policy, traffic handling policy, and the like that are associated with the tenant.

In block 406, the network device 110 subdivides the workload associated with the network traffic based on the evaluation of the characteristics of the network traffic relative to one or more policies. For instance, in block 408, the network device 110 may identify requirements (e.g., resource requirements, policy requirements, etc.) for the underlying workload of the network traffic. Further, in block 410, the network device 110 evaluates characteristics associated with the switch and entities that can potentially process the underlying workload. In particular, the network device 110 evaluates an amount of resources (e.g., compute resources) can be used by the network device 110 to process the workload. Doing so allows workloads that need a result in a relatively fast manner (e.g., autonomous vehicle decision making) to receive the result without forwarding traffic data further downstream in the edge network. Further, the network device 110 evaluates how much throughput is available in the edge network data plane to service the workload (as a function of the required throughput of the workload). Further still, the network device 110 may also identify available entities in the edge network (e.g., other edge servers, service provider devices, network devices) that are available to receive and process the workload data. The network device 110 may then identify a load balancing scheme to apply to the distribution of the workload.

In block 412, the network device 110 determines whether any portion of the workload (e.g., one or more tasks of the workload) can be performed thereon, based on the previous evaluation. If so, then in block 414, the network device 110 offloads the identified portion of the workload for processing. The portions may be identified as a function of the decrypted payload in one or more of the packets of the network traffic.

In block 416, the network device 110 determines whether any portions of the workload (e.g., one or more tasks of the workload) are remaining for forwarding to other entities in the edge network. If so, then in block 418, the network device 110 forwards the traffic to the identified entities (e.g., edge servers, network devices, etc.) in the edge network. More particularly, the network device 110 may forward portions of the network traffic to each of the identified entities to process the workload according to characteristics of the entities and the workload.

Figure 5:
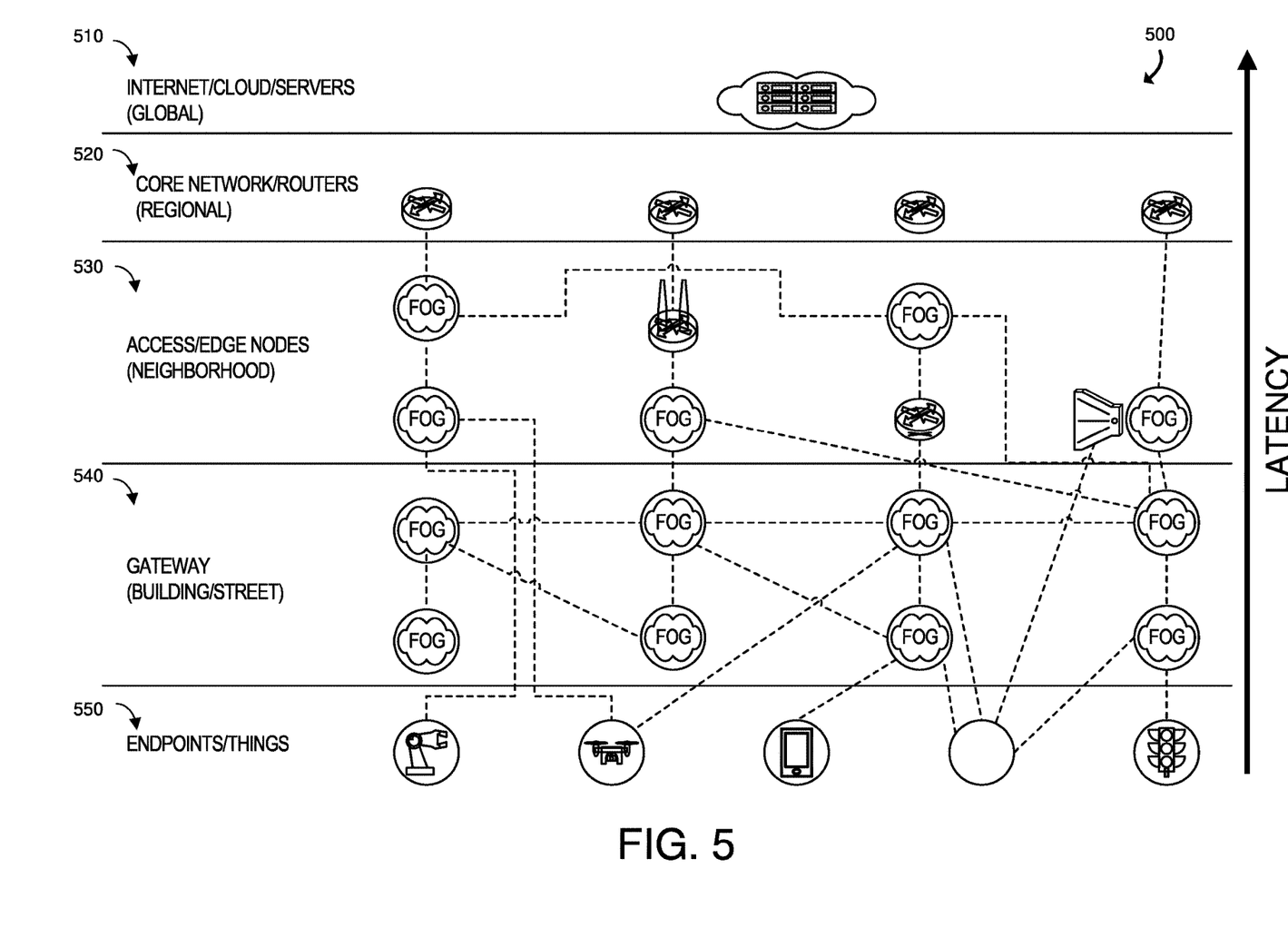
FIG. 5 is a simplified block diagram of a fog and mobile edge computing (MEC) network topology that may be used with the system of FIG. 1.

Referring briefly to FIG. 5, a mobile edge computing (MEC) and fog network topology 500 is shown. The network topology 500 includes endpoints (at an endpoints/things network layer 550), gateways (at a gateway layer 540), access or edge computing nodes (e.g., at neighborhood nodes layer 530), core network or routers (e.g., at a regional or central office layer 520). A fog network (e.g., established at the gateway layer 540) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 5 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

EXAMPLES

Illustrative examples of the technologies disclosed herein are provided below. An embodiment of the technologies may include any one or more, and any combination of, the examples described below.

Example 1 includes a network device in a network platform comprising circuitry to receive network traffic including a packet associated with a tenant; upon a determination that the packet is encrypted, retrieve a secret key associated with the tenant; decrypt, using the secret key, a payload from the packet, wherein the payload is indicative of one or more characteristics associated with the network traffic; and upon a determination, based on an evaluation of the one or more characteristics, that the network traffic is associated with a workload requesting compute from a service hosted by the network platform, transmit the network traffic to the service hosted by the network platform.

Example 2 includes the subject matter of Example 1, and wherein the circuitry is further to, upon a determination that the network traffic is not associated with a workload requesting compute from the service hosted by the network platform, forward the network traffic to a specified destination.

Example 3 includes the subject matter of any of Examples 1 and 2, and wherein to retrieve the secret key associated with the tenant comprises to identify the tenant using an identifier included with the packet; and retrieve the secret key from a trusted execution environment of the network device.

Example 4 includes the subject matter of any of Examples 1-3, and wherein the determination based on the evaluation of the one or more characteristics that the network traffic is associated with the workload comprises to execute an accelerator function using the payload as input to determine whether the network traffic is targeting the service.

Example 5 includes the subject matter of any of Examples 1-4, and wherein the circuitry is further to evaluate the one or more characteristics relative to one or more policies associated with the tenant.

Example 6 includes the subject matter of any of Examples 1-5, and wherein to evaluate the one or more characteristics relative to one or more policies comprises to evaluate the one or more characteristics relative to at least one of a quality of service policy, service level agreement, security policy, or traffic policy associated with the tenant.

Example 7 includes the subject matter of any of Examples 1-6, and wherein the circuitry is further to subdivide, based on the evaluation of the one or more characteristics relative to the one or more policies, the workload for offloading the workload to one or more servers.

Example 8 includes the subject matter of any of Examples 1-7, and wherein to subdivide the workload comprises to evaluate an amount of compute resources available to be processed by the network device, an amount of throughput required maintain a load balancing in the one or more servers, an amount of the one or more servers that are available to process the workload.

Example 9 includes the subject matter of any of Examples 1-8, and wherein the circuitry is further to offload one or more tasks of the workload on the network device.

Example 10 includes the subject matter of any of Examples 1-9, and wherein the circuitry is further to forward one or more tasks of the workload to one or more service providers according to a load balancing technique.

Example 11 includes the subject matter of any of Examples 1-10, and wherein the circuitry is further to retrieve a destination-specific secret key that is different from the secret key associated with the tenant; re-encrypt, using the destination-specific secret key, the network traffic; and forward the original, decrypted or re-encrypted network traffic to the service hosted by the network platform.

Example 12 includes the subject matter of any of Examples 1-11, and wherein the circuitry is further to perform an address translation on the network traffic.

Example 13 includes a method, comprising receiving network traffic including a packet associated with a tenant; upon determining that the packet is encrypted, retrieving a secret key associated with the tenant; decrypting, using the secret key, a payload from the packet, wherein the payload is indicative of one or more characteristics associated with the network traffic; and upon determining, based on an evaluation of the one or more characteristics, that the network traffic is associated with a workload requesting compute from a service hosted by the network platform, transmitting the network traffic to the service hosted by the network platform.

Example 14 includes the subject matter of Example 13, and further including, upon determining that the network traffic is not associated with a workload requesting compute from the service hosted by the network platform, forwarding the network traffic to a specified destination.

Example 15 includes the subject matter of any of Examples 13 and 14, and wherein retrieving the secret key associated with the tenant comprises identifying the tenant using an identifier included with the packet; and retrieving the secret key from a trusted execution environment of the network device.

Example 16 includes the subject matter of any of Examples 13-15, and wherein the determination based on the evaluation of the one or more characteristics that the network traffic is associated with the workload comprises executing an accelerator function using the payload as input to determine whether the network traffic is targeting the service.

Example 17 includes the subject matter of any of Examples 13-16, and further including, evaluating the one or more characteristics relative to one or more policies associated with the tenant.

Example 18 includes the subject matter of any of Examples 13-17, and further including, subdividing, based on the evaluation of the one or more characteristics relative to the one or more policies, the workload for offloading the workload to one or more servers.

Example 19 includes the subject matter of any of Examples 13-18, and wherein subdividing the workload comprises evaluating an amount of compute resources available to be processed by the network device, an amount of throughput required maintain a load balancing in the one or more servers, an amount of the one or more servers that are available to process the workload.

Example 20 includes a network device comprising circuitry for receiving network traffic including a packet associated with a tenant; means for retrieving, upon determining that the packet is encrypted, a secret key associated with the tenant; means for decrypting, using the secret key, a payload from the packet, wherein the payload is indicative of one or more characteristics associated with the network traffic; and circuitry for transmitting, upon determining, based on an evaluation of the one or more characteristics, that the network traffic is associated with a workload requesting compute from a service hosted by the network platform, the network traffic to the service hosted by the network platform.

What is claimed is:

1. A network device in a network platform, the network device comprising:
   memory; and
   circuitry to:
      receive network traffic including a packet associated with a tenant, the network traffic associated with a workload requesting a service hosted by a compute node external to the network platform;
      in response to determining that the packet is encrypted, retrieve a secret key associated with the tenant;
      decrypt, using the secret key, a payload of the packet, the payload to indicate one or more characteristics associated with the network traffic; and
      in response to determining, based on an evaluation of the one or more characteristics, that the network device can perform a first task of the workload that requires a result in less time than a second task of the workload, transmit a first portion of the network traffic associated with the first task to a compute resource of the network device and a second portion of the network traffic associated with the second task to one or more servers of the network platform.

2. The network device of claim 1, wherein the circuitry is to, in response to determining that the network traffic is not associated with any workload requesting the service hosted by the network platform, transmit the network traffic to a destination specified in the packet.

3. The network device of claim 1, wherein the circuitry is to:
   identify the tenant using an identifier included with the packet; and
   retrieve the secret key from a trusted execution environment of the network device.

4. The network device of claim 1, wherein the circuitry is to execute an accelerator function using the payload as input to determine whether the network traffic is associated with the workload requesting the service.

5. The network device of claim 1, wherein the circuitry is to evaluate the one or more characteristics based on one or more policies associated with the tenant.

6. The network device of claim 5, wherein the one or more policies include at least one of a quality of service policy, service level agreement, security policy, or traffic policy associated with the tenant.

7. The network device of claim 5, wherein the circuitry is to subdivide, the workload into the first task and the second task for offloading to the compute resource of the network device and the one or more servers based on the evaluation of the one or more characteristics based on the one or more policies.

8. The network device of claim 1, wherein the circuitry is to evaluate one or more characteristics associated with the network device and the one or more servers including at least one of an amount of the compute resource available at the network device to process the workload, an amount of throughput required to maintain a load balancing in the one or more servers, or an amount of the one or more servers that are available to process the workload.

9. The network device of claim 5, wherein the circuitry is to transmit a third task of the workload to the compute resource of the network device.

10. The network device of claim 5, wherein the circuitry is to transmit one or more tasks of the workload to the compute node external to the network platform according to a load balancing technique.

11. The network device of claim 1, wherein the circuitry is to:
   retrieve a destination-specific secret key that is different from the secret key associated with the tenant;
   re-encrypt the network traffic using the destination-specific secret key; and
   transmit the network traffic, the decrypted payload of the packet of the network traffic, or the re-encrypted network traffic to the at least one of the one or more servers hosting the service.

12. The network device of claim 1, wherein the circuitry is to perform an address translation on the network traffic.

13. A method comprising:
   receiving, at a network device of a network platform, network traffic including a packet associated with a tenant, the network traffic associated with a workload requesting a service hosted by a compute node external to the network platform;
   in response to determining that the packet is encrypted, retrieving a secret key associated with the tenant;

decrypting, using the secret key, a payload of the packet, the payload to indicate one or more characteristics associated with the network traffic; and in response to determining, based on an evaluation of the one or more characteristics, that the network device can perform a first task of the workload that requires a result in less time than a second task of the workload, transmitting a first portion of the network traffic associated with the first task to a compute resource of the network device and a second portion of the network traffic associated with the second task to one or more servers of the network platform.

14. The method of claim 13, further including, in response to determining that the network traffic is not associated with any workload requesting the service hosted by the one or more servers of the network platform, transmitting the network traffic to a destination specified in the packet.

15. The method of claim 13, further including:
identifying the tenant using an identifier included with the packet; and
retrieving the secret key from a trusted execution environment of the network device.

16. The method of claim 13, further including executing an accelerator function using the payload as input to determine whether the network traffic is associated with the workload requesting the service.

17. The method of claim 13, further including, evaluating the one or more characteristics based on one or more policies associated with the tenant.

18. The method of claim 17, further including subdividing the workload into the first task and the second task for offloading to the compute resource of the network device and the one or more servers based on the evaluation of the one or more characteristics based on the one or more policies.

19. The method of claim 18, further including evaluating one or more characteristics associated with the network device and the one or more servers including at least one of an amount of the compute resource available at the network device to process the workload, an amount of throughput required to maintain a load balancing in the one or more servers, or an amount of the one or more servers that are available to process the workload.

20. A network device in a network platform, the network device comprising:
means for receiving network traffic including a packet associated with a tenant, the network traffic associated with a workload requesting a service hosted by a compute node external to the network platform;
means for retrieving, in response to determining that the packet is encrypted, a secret key associated with the tenant;
means for decrypting, using the secret key, a payload of the packet, the payload to indicate one or more characteristics associated with the network traffic; and
means for transmitting, in response to determining, based on an evaluation of the one or more characteristics, that the network device can perform a first task of the workload that requires a result in less time than a second task of the workload, a first portion of the network traffic associated with the first task to a compute resource of the network device and a second portion of the network traffic associated with the second task to one or more servers of the network platform.

* * * * *